United States Patent
Matsuki et al.

(10) Patent No.: US 12,145,470 B2
(45) Date of Patent: Nov. 19, 2024

(54) BRAKING CONTROL DEVICE OF INDUSTRIAL VEHICLE

(71) Applicant: KABUSHIKI KAISHA TOYOTA JIDOSHOKKI, Kariya (JP)

(72) Inventors: Takanori Matsuki, Kariya (JP); Gouki Kawaguchi, Kariya (JP)

(73) Assignee: KABUSHIKI KAISHA TOYOTA JIDOSHOKKI, Kariya (JP)

( * ) Notice: Subject to any disclaimer, the term of this patent is extended or adjusted under 35 U.S.C. 154(b) by 341 days.

(21) Appl. No.: 17/671,094

(22) Filed: Feb. 14, 2022

(65) Prior Publication Data

US 2022/0258614 A1 Aug. 18, 2022

(30) Foreign Application Priority Data

Feb. 17, 2021 (JP) .................................. 2021-023269

(51) Int. Cl.
  *B60L 7/26* (2006.01)
  *B60W 10/184* (2012.01)
  *B60W 10/196* (2012.01)
  *B60W 30/18* (2012.01)

(52) U.S. Cl.
  CPC ............. *B60L 7/26* (2013.01); *B60W 10/184* (2013.01); *B60W 10/196* (2013.01); *B60W 30/18127* (2013.01); *B60L 2200/44* (2013.01); *B60W 2710/248* (2013.01)

(58) Field of Classification Search
  None
  See application file for complete search history.

(56) References Cited

U.S. PATENT DOCUMENTS

2018/0015830 A1   1/2018   Brouwer

FOREIGN PATENT DOCUMENTS

| CN | 105905107 A | * | 8/2016 | ............. B60L 1/003 |
|---|---|---|---|---|
| JP | 2001-28803 A | | 1/2001 | |
| JP | 2004-222395 A | | 8/2004 | |
| JP | 2006-224768 A | | 8/2006 | |

(Continued)

OTHER PUBLICATIONS

Extended European Search Report dated Jul. 6, 2022 in Application No. 22154733.4.

(Continued)

*Primary Examiner* — Melanie Torres Williams
(74) *Attorney, Agent, or Firm* — Sughrue Mion, PLLC (57) ABSTRACT

A braking control device of an industrial vehicle includes a travel motor configured to generate regenerative braking force and a mechanical brake configured to generate mechanical braking force as a braking unit and including a battery configured to be charged by the regenerative braking force. The device is configured to acquire vehicle speed information of the industrial vehicle, acquire a regenerative current of the travel motor, execute autonomous driving with a required braking force including the regenerative braking force for causing a vehicle speed of the industrial vehicle descending a slope to be a target vehicle speed based on the vehicle speed information, and adjust distribution of the mechanical braking force in the required braking force so that the acquired regenerative current is equal to or less than an upper regenerative threshold value smaller than a maximum regenerative current.

4 Claims, 5 Drawing Sheets

(56) References Cited

FOREIGN PATENT DOCUMENTS

| | | |
|---|---|---|
| JP | 2009-213810 A | 9/2009 |
| JP | 2011-063145 A | 3/2011 |
| JP | 2012-200048 A | 10/2012 |
| JP | 2017-208898 A | 11/2017 |
| JP | 6693400 B2 * | 5/2020 ............ B60L 3/0084 |

OTHER PUBLICATIONS

Andreas Wilde, Dissertation, Oct. 27, 2009, XP055316684, Retrieved from the Internet: URL: http://d-nb.info/1000013637x/34 [retrieved on Nov. 4, 2016] (164 total pages).

* cited by examiner

BRAKING CONTROL DEVICE OF INDUSTRIAL VEHICLE

TECHNICAL FIELD

The present disclosure relates to a braking control device of an industrial vehicle.

CROSS-REFERENCE TO RELATED APPLICATION

This application claims the benefit of priority from Japanese Patent Application No. 2021-023269, filed on Feb. 17, 2021, the entire contents of which are incorporated herein by reference.

BACKGROUND

In related technique, Japanese Unexamined Patent Publication No. 2012-200048 and Japanese Unexamined Patent Publication No. 2006-224768 disclose a technology related to a braking control device of an industrial vehicle, for example. Japanese Unexamined Patent Publication No. 2012-200048 discloses the braking control device of an industrial vehicle configured to control an inverter control device that limits the regenerative torque command value of the travel motor based on the terminal voltage of she battery in which she regenerative power by the travel motor is charged. Japanese Unexamined Patent Publication No. 2006-224768 discloses the braking control device of industrial vehicles configured to reduce the proportion of the braking force by a friction braking means with respect to the total braking force from the early stage of braking to the late stage of braking, based on the amount of depression of the brake pedal and whether the battery has a predetermined storage capacity or more.

It has been attempted to configure an industrial vehicle such as a towing tractor or a forklift as an electric vehicle capable of autonomous driving in a limited area. For example, when an industrial vehicle is descending a slope while braking to maintain the vehicle speed of the industrial vehicle at the target vehicle speed, the regenerative braking may be interrupted to protect the battery when the battery approaches a fully charged state due to regenerative charging. However, braking in response to an autonomous driving control is performed without operating the brake pedal, so it is not appropriate to take measures against interrupting regenerative braking based on the operation of the brake pedal. Accordingly, in the present technical field, it is desired to prevent the interruption of regenerative braking without being based on the operation of the brake pedal.

The present disclosure provides a braking control device of an industrial vehicle capable of preventing interruption of regenerative braking in an industrial vehicle descending a slope by autonomous driving using regenerative braking, without being based on a brake pedal operation.

SUMMARY

According to an aspect of the present disclosure, a braking control device of an industrial vehicle, which is a braking control device of an industrial vehicle including a travel motor configured to generate regenerative braking force and a mechanical brake configured to generate mechanical braking force as a braking unit and including a battery configured to be charged by the regenerative braking force, includes a vehicle speed information acquisition unit configured to acquire vehicle speed information of the industrial vehicle, a regenerative current acquisition unit configured to acquire a regenerative current of the travel motor, an autonomous driving control unit configured to execute autonomous driving with a required braking force including the regenerative braking force for causing a vehicle speed of the industrial vehicle descending a slope to be a target vehicle speed, based on the vehicle speed information, and a braking force control unit configured to adjust distribution of the mechanical braking force in the required braking force so that the acquired regenerative current is equal to or less than an upper regenerative threshold value smaller than a maximum regenerative current.

DETAILED DESCRIPTION

Hereinafter, embodiments of the present disclosure will be described in detail with reference to the drawings. In the drawings, the same or equivalent elements are designated by the same reference numerals, and duplicate description will be omitted.

Figure 1:
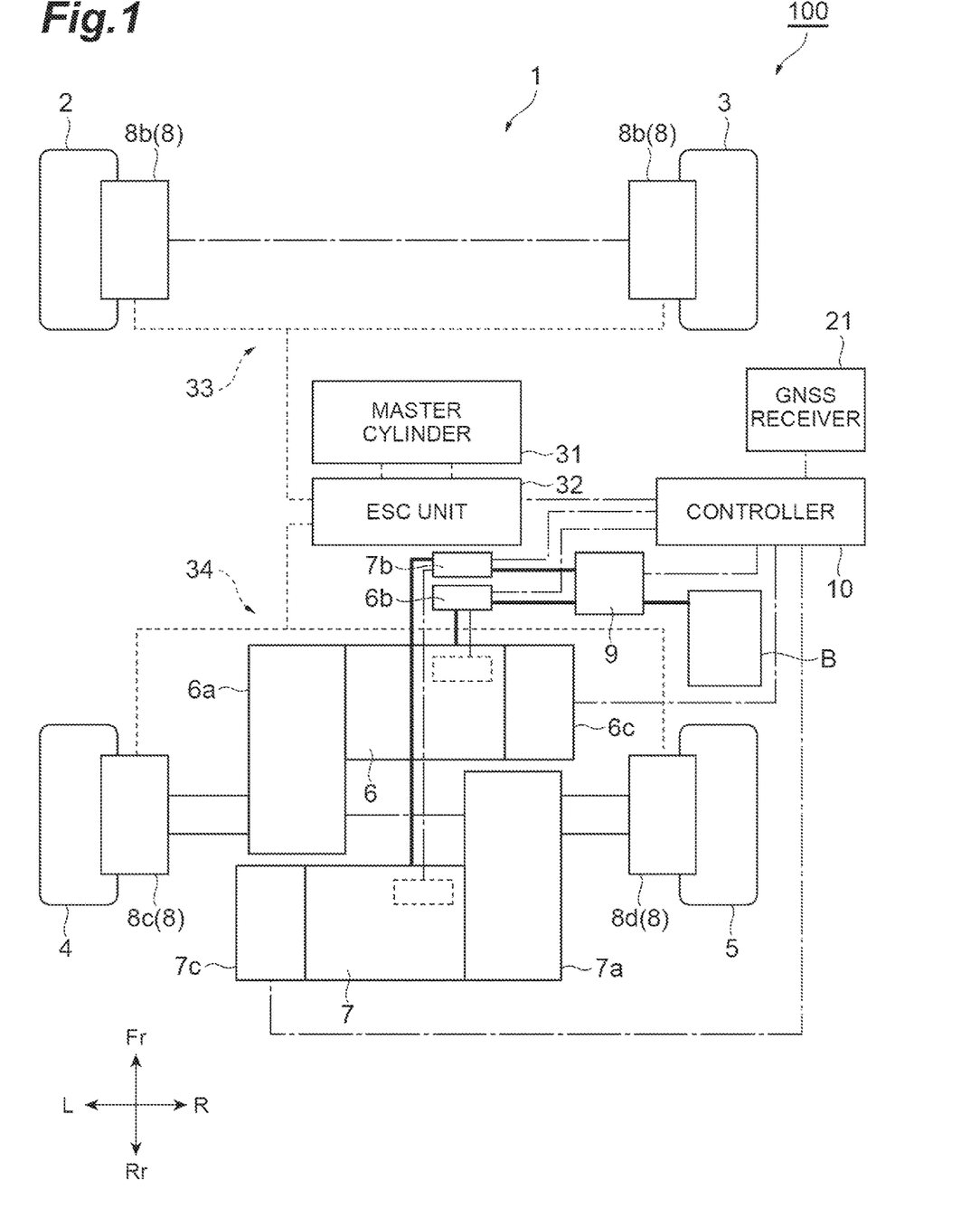
FIG. 1 is a schematic configuration diagram of an industrial vehicle to which a braking control device of the industrial vehicle according to an embodiment is applied.

FIG. 1 is a schematic configuration diagram of an industrial vehicle to which a braking control device of the industrial vehicle according to an embodiment is applied. An industrial vehicle 1 illustrated in FIG. 1 is, for example, an electric towing tractor. The industrial vehicle 1 is used to tow a container loaded with a cargo at an airport, a factory, a port, or the like.

The industrial vehicle 1 is configured to be capable of executing autonomous driving control. The autonomous driving is a driving state in which vehicle control for the industrial vehicle 1 automatically traveling is executed according to a transportation command from, for example, an operation management system or the like. The operation management system performs transportation command, operation monitoring, vehicle state monitoring, or the like for the industrial vehicle 1. The operation management system is a so-called control system. In autonomous driving, the operator does not need to perform driving operation and the vehicle travels automatically.

The autonomous driving here is carried out in a predetermined area including, for example, a runway, a takeoff and landing area, a taxiway, an apron, a control tower, a hangar, a cargo handling area, a charging area, or the like at an airport. The industrial vehicle 1 may be capable of autonomous driving on an unfixed travel route within a predetermined area. An unfixed travel route does not mean a travel route that is difficult to change once it is set, such as an automated guided vehicle (AGV) that travels along a magnetic tape installed on the road surface, but means a travel route that can be changed by changing the travel plan generated based on map information or the like. The industrial vehicle 1 may be capable of autonomous driving in a predetermined area according to a travel plan in which a travel route is predetermined and the travel plan is generated not to consider the influence of a downhill existing on the travel route. The travel plan that does not consider the influence of a downhill means a travel plan that does not set a target deceleration or the like in advance in feedforward in consideration of the downhill gradient. In the industrial vehicle 1, feedback control of the vehicle speed is performed in real time so that the vehicle speed during descending a slope is the target vehicle speed.

[Configuration Related to Traveling and Braking of Industrial Vehicle 1]

The industrial vehicle 1 includes an FL tire 2 and a FR tire 3 disposed at the front portion of the vehicle body, and an RL tire 4 and a RR tire 5 disposed at the rear portion of tire vehicle body. The industrial vehicle 1 includes, as travel motors, a left travel motor 6 for driving the RL tire 4 and a right travel motor 7 for driving the RR tire 5. The travel motor also functions as a braking unit 8 that generates a regenerative braking force.

The left travel motor 6 and the right travel motor 7 are AC motors that also function as generators. A left drive unit 6a, which is a speed reducer, is interposed between the left travel motor 6 and the RL tire 4. A right drive unit 7a, which is a speed reducer, is interposed between the right travel motor 7 and the RR tire 5.

The left travel motor 6 is electrically connected to a contactor 9 via a left motor driver 6b. The right travel motor 7 is electrically connected to the contactor 9 via a right motor driver 7b. Each of the left motor driver 6b and the right motor driver 7b has, for example, an inverter and is electrically connected to the controller 10. The power running and regeneration of the left travel motor 6 are controlled by the controller 10 via the left motor driver 6b. The power running and regeneration of the right travel motor 7 are controlled by the controller 10 via the right motor driver 7b. The left motor driver 6b measures the regenerative current of the left travel motor 6. The right motor driver 7b measures the regenerative current of the right travel motor 7. In addition to measuring the regenerative current of the left travel motor 6 using the left motor driver 6b, or instead of measuring the regenerative current of the left travel motor 6 using the left motor driver 6b, the regenerative current of the left travel motor 6 may be measured by a current sensor separately provided in the left travel motor 6. In addition to measuring the regenerative current of the right travel motor 7 using the right motor driver 7b, or instead of measuring the regenerative current of the right travel motor 7 using the right motor driver 7b, the regenerative current of the right travel motor 7 may be measured by a current sensor separately provided in the right travel motor 7.

The contactor 9 is electrically connected to a battery B. The contactor 9 is electrically connected to the controller 10. In the contactor 9, the power supply of the battery B including the emergency stop is controlled by the controller 10.

The battery B is a power supply source for the left travel motor 6 and the right travel motor 7. The battery B is constituted with a storage battery (for example, a lead storage battery). The battery B can store the regenerative power generated by the regenerative braking of the left travel motor 6 and the right travel motor 7.

When the left travel motor 6 is rotationally driven, the driving force of the left travel motor 6 is transmitted to the RL tire 4 via the left drive unit 6a, and the RL tire 4 rotates. The left travel motor 6 also functions as a generator. Specifically, when braking the industrial vehicle 1, the left travel motor 6 operates as a generator due to the rotation of the RL tire 4. Regenerative power is generated from the left travel motor 6, and the RL tire 4 is braked by the regenerative braking force. That is, the regenerative braking of the left travel motor 6 is performed.

When the right travel motor 7 is rotationally driven, the driving force of the right travel motor 7 is transmitted to the RR tire 5 via the right drive unit 7a, and the RR tire 5 rotates. The right travel motor 7 also functions as a generator. Specifically, what braking the industrial vehicle 1, the right travel motor 7 operates as a generator due to the rotation of the RR tire 5. Regenerative power is generated from the right travel motor 7, and the RR tire 5 is braked by the regenerative braking force. That is, the regenerative braking of the right travel motor 7 is performed.

The industrial vehicle 1 includes an FL disc brake 8a and a FR disc brake 8b disposed at the front portion of the vehicle body as mechanical brakes in the braking unit 8. The FL disc brake 8a is provided so that the FL tire 2 can be braked. The FR disc brake 8b is provided so that the FR tire 3 can be braked. The industrial vehicle 1 includes an RL drum brake 8c and an RR drum brake 8d disposed at the rear portion of the vehicle body. The RL drum brake 8c is provided so that the RL tire 4 can be braked. The RR drum brake 8d is provided so that the RR tire 5 can be braked.

The industrial vehicle 1 includes a master cylinder 31 and an electric stability control (ESC) unit 32. The master cylinder 31 has a reservoir tank for storing brake fluid. The master cylinder 31 may have a function of generating oil pressure, but here, only the function of the reservoir tank is used. The reservoir tank is connected to the ESC unit 32 by a hydraulic circuit. Instead of the master cylinder 31, a reservoir tank that does not have a function of generating oil pressure may be provided.

The ESC unit 32 is, for example, a hydraulic control unit in which a processor, a motor, a pump, and a valve are integrated. The processor is, for example, an arithmetic unit such as a central processing unit (CPU). The processor comprehensively controls, for example, the read only memory (ROM), the random access memory (RAM), and the communication interface. The ESC unit 32 does not necessarily have to have a function related to stability control.

The ESC unit 32 is electrically connected to the controller 10. The ESC unit 32 has, for example, a built-in electric pump, and can increase or decrease the oil pressure in response to the signal of the oil pressure increase and decrease instruction from the controller 10. The ESC unit 32 has a built-in oil pressure sensor, and the oil pressure information measured by the oil pressure sensor is transmitted to the controller 10. The ESC unit 32 is controlled by the controller 10 in response to a control signal from the controller 10 based on, for example, hydraulic information.

The ESC unit 32 is connected to the FL disc brake 8*a* and the FR disc brake 8*b* by a hydraulic circuit 33 for front wheel braking. The ESC unit 32 is connected to the RL dram brake 8*c* and the RR dram brake 8*d* by a hydraulic circuit 34 for rear wheel braking.

When the ESC unit 32 increases or decreases the oil pressure in response to the signal of the oil pressure increase and decrease instruction from the controller 10, the hydraulic oil is independently supplied to each of the hydraulic circuit 33 and the hydraulic circuit 34. When hydraulic oil is supplied to the FL disc brake 8*a* and the FR disc brake 8*b*, the FL disc brake 8*a* and the FR disc brake 8*b* are operated, and the FL tire 2 and the FR tire 3 are braked by the mechanical braking force. When hydraulic oil is supplied to the RL drum brake 8*c* and the RR drum brake 8*d*, the RL drum brake 8*c* and the RR drum brake 8*d* are operated, and the RL tire 4 and the RR tire 5 are braked by the mechanical braking force. The FL tire 2 and the FR fire 3 can be braked independently of the RL tire 4 and the RR tire 5.

The industrial vehicle 1 includes a left electromagnetic brake 6*c* attached so that the left travel motor 6 can be braked. The industrial vehicle 1 includes a right electromagnetic brake 7*c* attached so that the right travel motor 7 can be braked. Each of the left electromagnetic brake 6*c* and the right electromagnetic brake 7*c* is electrically connected to the controller 10. The left electromagnetic brake 6*c* and the right electromagnetic brake 7*c* are used as parking brakes when the industrial vehicle 1 is parked.

[Configuration Related to Autonomous Driving Control and Braking Control of Industrial Vehicle 1]

Figure 2:
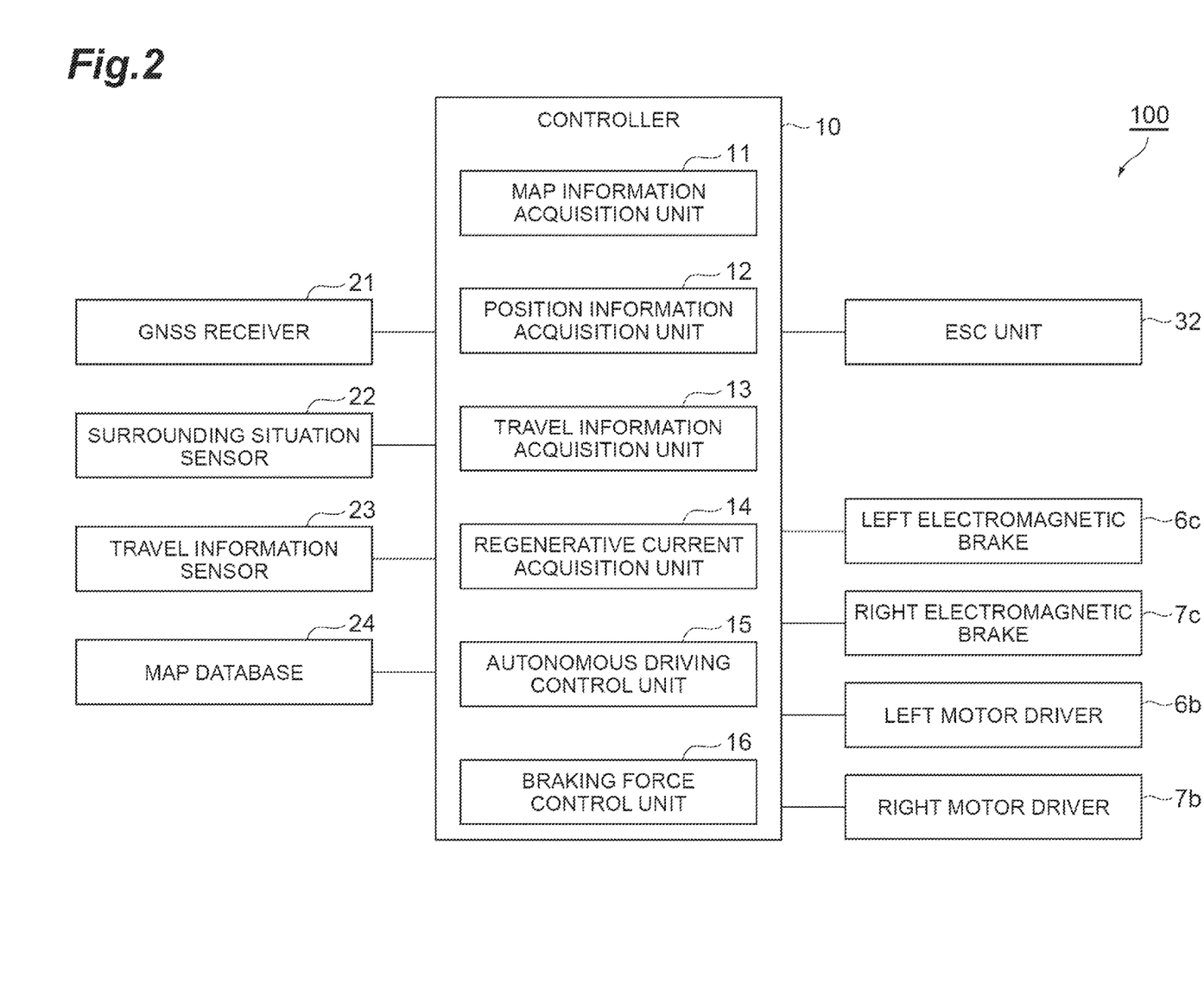
FIG. 2 is a block diagram illustrating a functional configuration of the braking control device of the industrial vehicle of FIG. 1.

FIG. 2 is a block diagram illustrating a functional configuration of the braking control device of the industrial vehicle of FIG. 1. The braking control device 100 of the industrial vehicle has the controller 10 that manages the braking control and the autonomous driving control of the industrial vehicle 1. The controller 10 is an electronic control unit having a CPU, a ROM, a RAM, or the like. In the controller 10, for example, the program recorded in the ROM is loaded into the RAM, and the program loaded in the RAM is executed by the CPU to realize various functions. The controller 10 may measure the voltage of the battery B. The controller 10 may be constituted with a plurality of electronic units.

The controller 10 is connected to a GNSS receiver 21, a surrounding situation sensor 22, a travel in format ion sensor 23, and a map database 24.

The GNSS receiver 21 measures the position on the map of the industrial vehicle 1 (for example, the latitude and longitude of the industrial vehicle 1) by receiving signals from three or more GNSS satellites. The GNSS receiver 21 transmits the measured position information of the industrial vehicle 1 to the controller 10.

The surrounding situation sensor 22 is an in-vehicle measurer that measures the surrounding situation of the vehicle. The surrounding situation sensor 22 includes a camera and light detection and ranging (LiDAR). The captured image information of the camera is used, for example, for road surface pattern recognition and matching. The obstacle information measured by the LiDAR is used, for example, for avoiding the danger of the industrial vehicle 1.

The surrounding situation sensor 22 transmits information related to the surrounding situation of the industrial vehicle 1 to the controller 10.

The travel information sensor 23 is a measurer that measures the travel state of the industrial vehicle 1. The travel information sensor 23 includes a vehicle speed sensor, an acceleration sensor, and a yaw rate sensor (gyro sensor). The vehicle speed sensor is a measurer that measures the speed of the industrial vehicle 1. As the vehicle speed sensor, for example, speed sensors provided in each of the left travel motor 6 and the right travel motor 7 are used. The speed sensor measures each of the rotation speed of the left travel motor 6 and the rotation speed of the right travel motor 7. The travel information sensor 23 transmits the measured travel information to the controller 10.

The map database 24 is a database that stores map information. The map database 24 is created in, for example, a storage device (for example, hard disk drive (HDD) or the like) mounted on the industrial vehicle 1. The map information includes road position information, road shape information (for example, curves, types of straight portions, curvatures of curves, or the like), position information of intersections and branch points, position information of structures, or the like as information in a predetermined area including a runway, a takeoff and landing area, a taxiway, an apron, a control tower, a hangar, a cargo handling area, a charging area, or the like at an airport. The map information includes the position information of the road surface pattern used for the position recognition of the industrial vehicle 1. The map database 24 may be created on a server capable of communicating with the industrial vehicle 1.

The map information includes position information of a downhill. The position information of a downhill is used to determine whether the industrial vehicle 1 performs the autonomous driving processing during descending a slope, which will be described later. The position information of a downhill includes position information of a downhill having a slope such that the battery B can be overcharged unless the regenerative current is prevented. The position information of a downhill may include at least one of position information of a downhill having a length of a predetermined distance or more and position information of a downhill having a slope of a predetermined gradient or more.

Next, the functional configuration of the controller 10 will be described. The controller 10 includes a map information acquisition unit 11, a position information acquisition unit 12, a travel information acquisition unit (vehicle speed information acquisition unit) 13, a regenerative current acquisition unit 14, an autonomous driving control unit 15, and a braking force control unit 16. Some of the functions of the controller 10 described below may be executed in a server capable of communicating with the industrial vehicle 1.

The map information acquisition unit 11 acquires the map information stored in the map database 24. The map information acquisition unit 11 acquires, for example, the position information of the road surface pattern used for the position recognition of the industrial vehicle 1 and the position information of the downhill having a slope such that the battery B can be overcharged unless the regenerative current is prevented.

The position information acquisition unit 12 acquires the position information of the industrial vehicle 1 based on the reception result of the GNSS receiver 21, the measurement result of the surrounding situation sensor 22, and the map information of the map database 24. The position information acquisition unit 12 acquires the self-position of the industrial vehicle 1 based on the position information of the road surface pattern included in the map information and the relative position information of the road surface pattern with respect to the industrial vehicle 1 measured by the surrounding situation sensor 22. The position information acquisition unit 12 may estimate the self-position of the industrial vehicle 1 by using, for example, the simultaneous localization and mapping (SLAM) method.

The travel information acquisition unit 13 acquires the travel information of the industrial vehicle 1 based on the measurement result of the travel information sensor 23. Here, the travel information acquisition unit 13 acquires vehicle speed information of the industrial vehicle 1 based on the measurement results of the speed sensors provided in each of the left travel motor 6 and the right travel motor 7. The travel information acquisition unit 13 may acquire the orientation of the industrial vehicle 1 based on the measurement result of the gyro sensor.

The regenerative current acquisition unit 14 acquires the regenerative current of the travel motor. Here, the regenerative current acquisition unit 14 acquires each of the regenerative currents of the left travel motor 6 and the right travel motor 7 by using the left motor driver 6b and the right motor driver 7b. When the left travel motor 6 is provided with a current sensor, the regenerative current acquisition unit 14 may acquire the regenerative current of the left travel motor 6 based on the measurement result of the current sensor. When the right travel motor 7 is provided with a current sensor, the regenerative current acquisition unit 14 may acquire the regenerative current of the right travel motor 7 based on the measurement result of the current sensor.

The autonomous driving control unit 15 executes autonomous driving control including calculation of the required deceleration of the industrial vehicle 1 based on the position information, the travel information, and the map information. The autonomous driving control unit 15 generates a travel plan along the target route based on the position information of the industrial vehicle 1 measured by the GNSS receiver 21, the map information of the map database 24, the surrounding situation (obstacle position, or the like) of the industrial vehicle 1 recognized from the measurement result of the surrounding situation sensor 22, and the travel state (vehicle speed, yaw rate, or the like) recognized from the measurement result of the travel information sensor 23. The target route is set in response to the transportation command or the like of the operation management system.

The autonomous driving control unit 15 executes autonomous driving according to the travel plan. The travel plan includes, for example, a target speed, a required acceleration, and a required deceleration. The travel plan may include a target steering angle. Here, the autonomous driving control unit 15 executes autonomous driving control and braking control so that the target speed, the required acceleration, and the required deceleration are realized by transmitting a control signal to the left drive unit 6a, the right drive unit 7a, and the ESC unit 32.

Based on the vehicle speed information, the autonomous driving control unit 15 executes autonomous driving by braking the industrial vehicle 1 descending a slope with the required braking force. The required braking force means a braking force for causing the vehicle speed of the industrial vehicle 1 descending a slope to be the target vehicle speed. The required braking force includes the regenerative braking force. The required braking force may include the mechanical braking force, or may include only the regenerative braking force without including the mechanical braking force. The required braking force here means, for example, the braking force required to realize the required deceleration. The required braking force is a term indicating the magnitude of the braking force required to cause the vehicle speed of the industrial vehicle 1 descending a slope to be the target vehicle speed. The required braking force may be calculated by the controller 10 as a specific parameter. The required braking force does not necessarily have to be calculated by the controller 10 as a specific parameter.

As an example, the autonomous driving control unit 15 sets a target speed in response to the position of the industrial vehicle 1. For example, when the industrial vehicle 1 descends a downhill, the autonomous driving control unit 15 sets the target speed to a predetermined constant speed (for example, 10 km/h, or the like) and calculates a deceleration of 0 as the required deceleration that maintains the vehicle speed of the industrial vehicle 1 at the target speed. In this case, when the industrial vehicle 1 accelerates and the vehicle speed increases due to the force acting on the industrial vehicle 1 on the downhill, the required braking force increases to decrease the increased vehicle speed toward the target vehicle speed. For example, when the downhill has a constant gradient, the required braking force is a substantially constant braking force.

The braking force control unit 16 controls the braking unit 8 based on the required deceleration. The braking force control unit 16 adjusts the distribution of the regenerative braking force and the mechanical braking force based on, for example, the position information of the industrial vehicle 1, the map information of the map database 24, and the regenerative current. The braking force control unit 16 adjusts the distribution of the mechanical braking force in the required braking force so that the acquired regenerative current is equal to or less than a first current value (an upper regenerative threshold value).

The first current value is the upper limit value of the regenerative current during descending a slope. The first current value is smaller than the maximum regenerative current. The maximum regenerative current means the regenerative current that can charge the battery B at the fastest speed. The first current value, for example, is set so that a situation in which the battery B reaches a fully charged state, the regenerative braking is unusable, and the braking force is insufficient (so-called regenerative loss) on the steepest downhill in a predetermined area in which the industrial vehicle 1 travels by autonomous driving, does not occur. The first current value can be set, tor example, by at least one of an experiment and a simulation. The steepest downhill includes the longest downhill in a predetermined area in which the industrial vehicle 1 travels by autonomous driving. The steepest downhill includes a downhill having the slope of the largest gradient in a predetermined area in which the industrial vehicle 1 travels by autonomous driving.

The braking force control unit 16 increases the mechanical braking force by a predetermined increase amount when the acquired regenerative current is equal to or higher than the first current value. The braking force control unit 16 may increase the mechanical braking force by increasing the brake oil pressure by a predetermined change amount ΔP, for example, when the acquired regenerative current is equal to or higher than the first current value.

The braking force control unit 16 decreases tire mechanical braking force by a predetermined decrease amount when the acquired regenerative current is equal to or less than a second current value (a lower regenerative threshold value), which is smaller than the first current value. The second current value is the lower limit value of the regenerative current during descending a slope when the mechanical braking force is generated. The second current value is made larger than 0 by a predetermined current value, for example, in order to avoid unnecessary switching between regeneration and power running. The predetermined current value can be set by, for example, at least one of an experiment and a simulation. The second current value may be 0.

The braking force control unit 16 may decrease the mechanical braking force by decreasing the brake oil pressure by the predetermined change amount ΔP, for example, when the acquired regenerative current is equal to or less than the second current value. That is, here, as an example, the absolute values of the increase amount and the decrease amount of the mechanical braking force are equal to each other. When the mechanical braking force is not generated, the braking force control unit 16 maintains a state in which the mechanical braking force is not generated although the regenerative current is equal to or less than the second current value.

In the present embodiment, adjusting the distribution of the regenerative braking force and the mechanical braking force means that the regenerative braking force changes in response to the change in the mechanical braking force. Specifically, the braking force control unit 16 calculates the regenerative braking force based on the rate change of the rotation speed of each of the left travel motor 6 and the right travel motor 7 measured by the speed sensor The braking force control unit 16 calculates the target rotation speeds of the left travel motor 6 and the right travel motor 7 causing the required deceleration (negative acceleration of the industrial vehicle 1), and calculates the regenerative braking force so that the total ion speeds of the left travel motor 6 and the right travel motor 7 are the corresponding target rotation speeds (for example, the rotation speed is reduced by a predetermined amount after a predetermined second, or the like). Accordingly, when the regenerative braking force and the mechanical braking force coexist, the target rotation speeds of the left travel motor 6 and the right travel motor 7 corresponding to the deceleration obtained by subtracting the deceleration caused by the mechanical braking force from the required deceleration are calculated. Accordingly, the larger the distribution of the mechanical braking force, the smaller the distribution of the regenerative braking force, and the smaller the distribution of the mechanical braking force, the larger the distribution of the regenerative braking force.

Figures 3A, 3B:
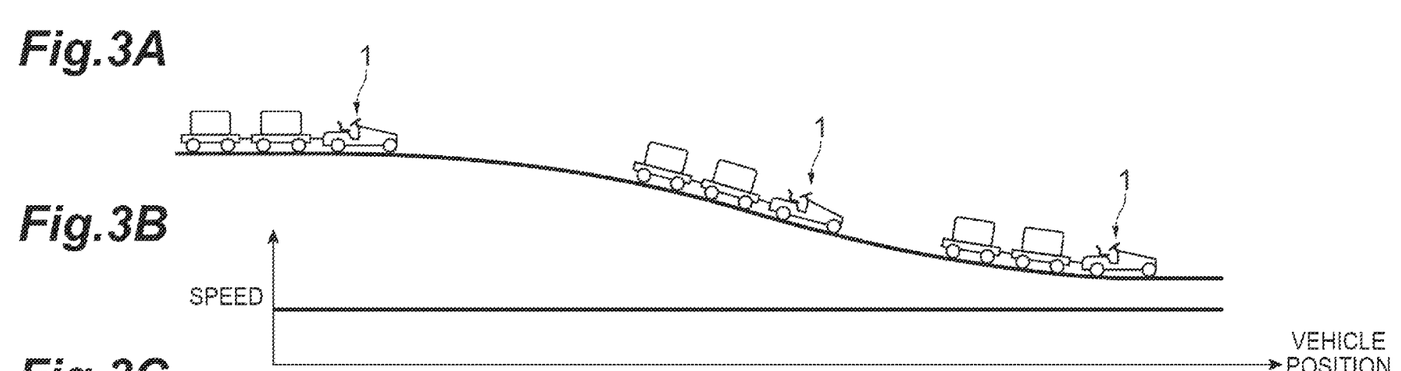
FIG. 3A is a timing chart illustrating a state in which an industrial vehicle descends a downhill by autonomous driving as an operation example of the braking control device of the industrial vehicle.
FIG. 3B is a timing chart illustrating a state in which the vehicle speed of the industrial vehicle is controlled to be the target vehicle speed as the operation example of the braking control device of the industrial vehicle.
Figures 3C, 3D:
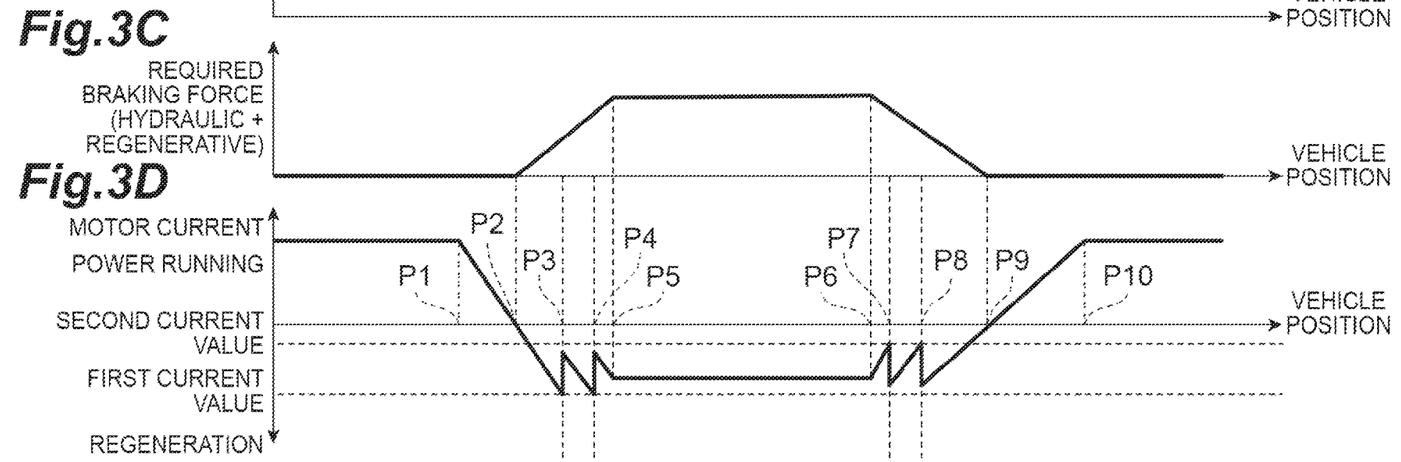
FIG. 3C is a timing chart illustrating the magnitude of the required braking force for controlling the vehicle speed of the industrial vehicle to be the target vehicle speed as the operation example of the braking control device of the industrial vehicle.
FIG. 3D is a timing chart illustrating a motor current in a travel motor of an industrial vehicle as the operation example of the braking control device of the industrial vehicle.
Figure 3E:
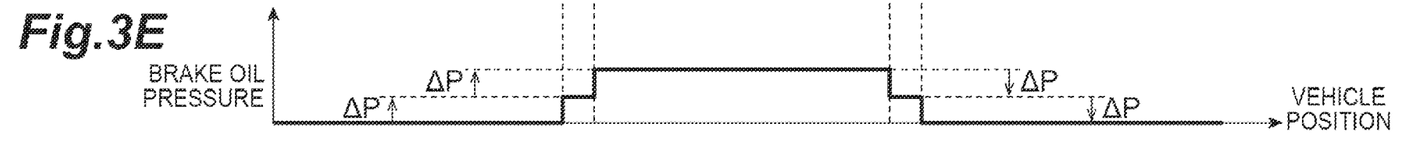
FIG. 3E is a timing chart illustrating an increase or decrease of the mechanical braking force as a time change of the brake oil pressure as the operation example of the braking control device of the industrial vehicle.

FIGS. 3A to 3E are timing charts illustrating an operation example of a braking control device of an industrial vehicle. FIG. 3A illustrates how the industrial vehicle 1 descends a downhill by autonomous driving. FIG. 3B illustrates how the vehicle speed of the industrial vehicle 1 is controlled to be the target vehicle speed. FIG. 3C illustrates the magnitude of the required braking force to control the vehicle speed of the industrial vehicle 1 to be the target vehicle speed. FIG. 3D illustrates the motor current in the travel motor of the industrial vehicle 1, where the upper vertical shaft represents the power running current and the lower vertical shall represents the regenerative current. FIG. 3E illustrates the state of increase or decrease of the mechanical braking force as a time change of the brake oil pressure.

As illustrated in FIGS. 3A to 3E, when the industrial vehicle 1 reaches a position P1, the power running current of the travel motor begins to decrease as the downhill gradient increases. When the industrial vehicle 1 reaches a position P2, the travel motor switches from power running to regeneration, and regenerative braking is started in order to maintain the vehicle speed at the target vehicle speed. The downhill gradient gradually increases from the position P1 to a position P5.

After that, when the industrial vehicle 1 reaches a position P3, the regenerative current of the travel motor increases, and as a result, the regenerative current reaches the first current value. Then, the brake oil pressure is increased by the change amount ΔP, and the mechanical braking force is increased. Since the required braking force for maintaining the vehicle speed at the target vehicle speed is momentarily constant, as the mechanical braking force increases, the equivalent regenerative braking force decreases. That is, the regenerative current decreases from the first current value. At this time, the regenerative current has a current value larger than the second current value. That is, the deceleration change of the mechanical braking force by this increase amount is smaller than the deceleration change of the regenerative braking force corresponding to the difference between the first current value and the second current value (the deceleration change when it is assumed that the regenerative current decreases from the first current value to the second current value).

After that, when the industrial vehicle 1 reaches a position P4, the regenerative current increases, and as a result, the regenerative current reaches the first current value again. Then, the brake oil pressure is increased again by the change amount ΔP, the mechanical braking force is increased, and the regenerative current decreases from the first current value. When the industrial vehicle 1 reaches a position P5, the downhill gradient is constant, and the required braking force does not change from the position P5 to the position P6. Accordingly, the regenerative current and the brake oil pressure remain in the state at the position P5.

When the industrial vehicle 1 reaches the position P6, the downhill gradient starts to decrease. As the required braking force begins to decrease, regenerative braking is relaxed and the regenerative current decreases. When the industrial vehicle 1 reaches a position P7, the regenerative current decreases, and as a result, the regenerative current reaches the second current value. Then, the brake oil pressure is decreased by the change amount ΔP, and the mechanical braking force is decreased. Again, since the required braking force for maintaining the vehicle speed at the target vehicle speed is momentarily constant, when the mechanical braking force decreases, the same regenerative braking force increases. That is, the regenerative current increases from the second current value. At this time, the regenerative current has a current value smaller than the first current value. That is, the deceleration change of the mechanical braking force by this decrease amount is smaller than the deceleration change of the regenerative braking force corresponding to the difference between the first current value and the second current value (the deceleration change when it is assumed that the regenerative current increases from the second current value to the first current value).

After that, when the industrial vehicle 1 reaches a position P8, the regenerative current decreases, and as a result, the regenerative current reaches the second current value again. Then, the brake oil pressure is decreased again by the change amount ΔP, the mechanical braking force is decreased, the mechanical braking force is 0, and the regenerative current increases from the second current value. When the industrial vehicle 1 reaches a position P9, it is switched from the regeneration to the power running, and the power running current increases until the downhill gradient disappears and is flat at a position P10.

By operating the braking control device 100 of the industrial vehicle as described above, the regenerative current is smaller than when regenerative braking is performed at the maximum regenerative current. As a result, the charging speed of the battery due to regeneration is slow, and it is difficult for the battery B to approach the fully charged state.

[Example of Arithmetic Processing by Controller 10]

Figure 4:
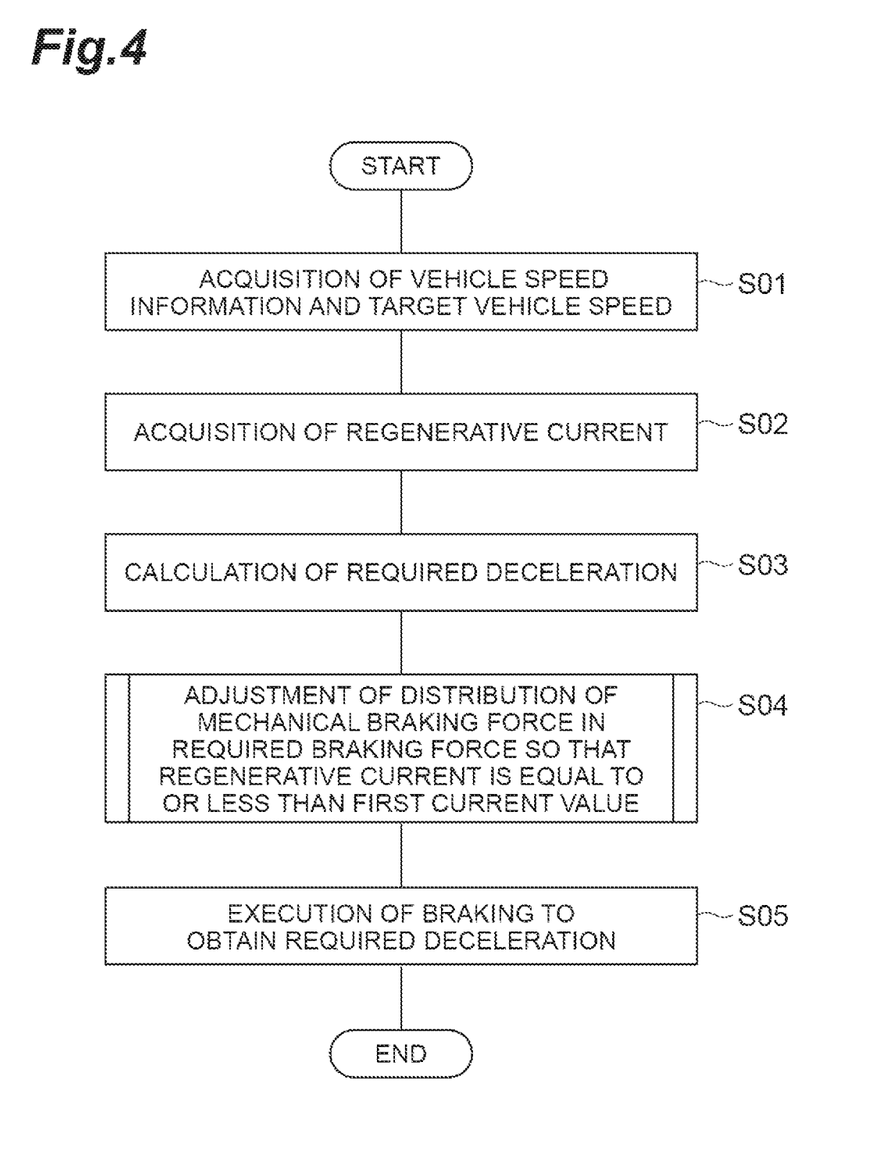
FIG. 4 is a flowchart illustrating an example of autonomous driving processing during descending a slope.

Next, an example of arithmetic processing by the controller 10 will be described. FIG. 4 is a flowchart illustrating an example of autonomous driving processing during descending a slope. The processing illustrated in FIG. 4 is executed when, for example, the industrial vehicle 1 during autonomous driving travels on a downhill having a slope such that the battery B can be overcharged unless the regenerative current is prevented. The controller 10 may determine whether the industrial vehicle 1 during autonomous driving travels on such a downhill based on the reception result of the GNSS receiver 21 (the position information of the industrial vehicle 1), the measurement result of the surrounding situation sensor 22, and the map information of the map database 24, by the position information acquisition unit 12.

As illustrated in FIG. 4, the controller 10 performs acquisition of the vehicle speed information and the target vehicle speed of the industrial vehicle 1 by the travel information acquisition unit 13 in a step S01. The travel information acquisition unit 13 acquires vehicle speed information of the industrial vehicle 1 based on, for example, the measurement result of the travel information sensor 23. The travel information acquisition unit 13 acquires, for example, the target vehicle speed in response to the position of the industrial vehicle 1 based on the acquisition result of the position information acquisition unit 12 and the map information of the map database 24.

In a step S02, the controller 10 performs acquisition of the regenerative current by the regenerative current acquisition unit 14. The regenerative current acquisition unit 14 uses, for example, the left motor driver 6b and the right motor driver 7b to measure each of the regenerative currents of the left travel motor 6 and the right travel motor 7.

In a step S03, the controller 10 calculates the required deceleration of the industrial vehicle 1 by the autonomous driving control unit 15. The autonomous driving control unit 15 calculates the required deceleration of the industrial vehicle 1 based on, for example, the difference between tire vehicle speed acquired by the travel information acquisition unit 13 and the target vehicle speed.

In a step S04, the controller 10 performs adjustment of the distribution of the mechanical braking force in the required braking force so that the regenerative current is equal to or less than the first current value, by the braking force control unit 16. The controller 10 specifically performs the distribution adjustment processing illustrated in FIG. 5 as the processing of the step S04.

Figure 5:
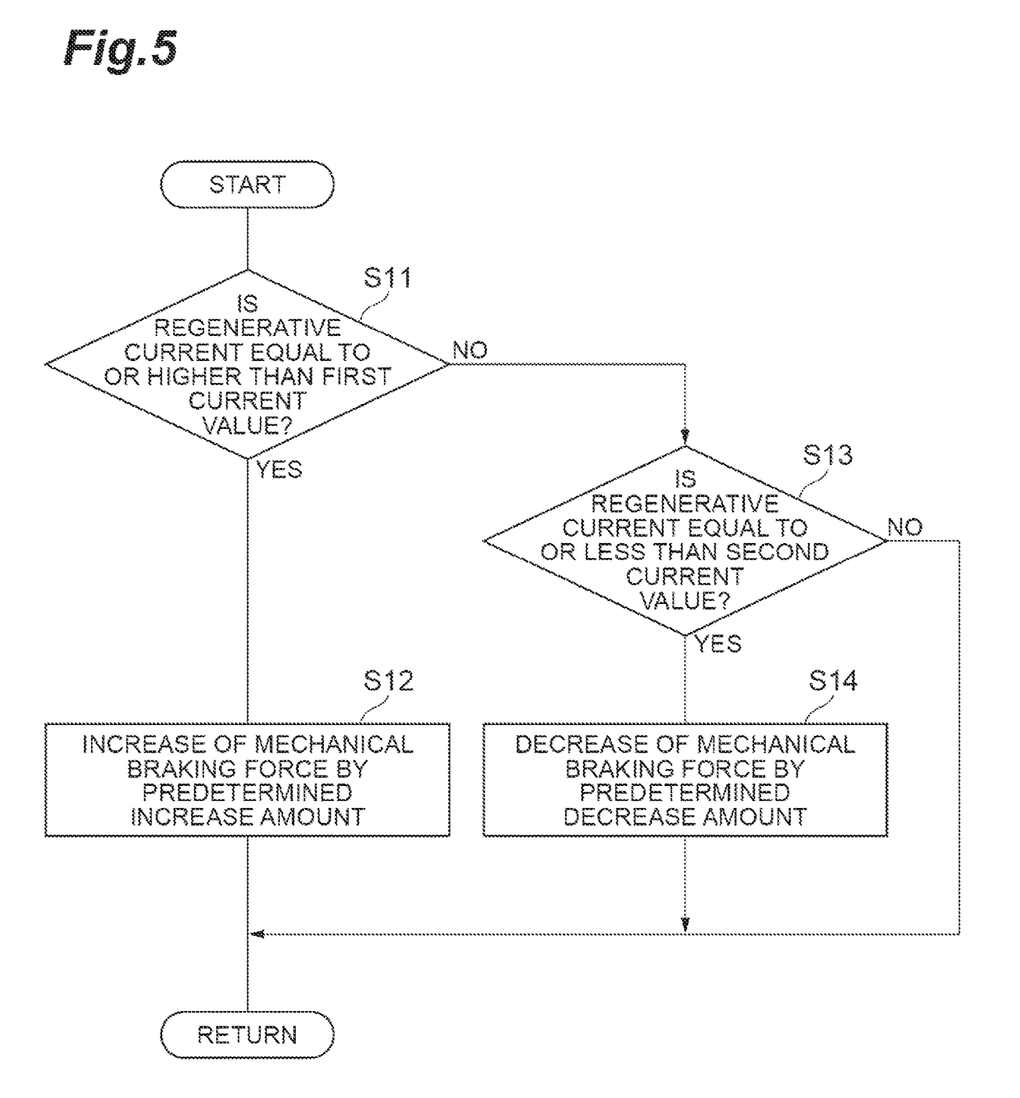
FIG. 5 is a flowchart illustrating an example of distribution adjustment processing of the braking force control unit.

FIG. 5 is a flowchart illustrating an example of the distribution adjustment processing of the braking force control unit 16. As illustrated in FIG. 5, the controller 10 performs determination on whether the regenerative current is equal to or higher than the first current value by the braking force control unit 16 in a step SU. The braking force control unit 16, for example, determines whether the regenerative current is equal to or higher than the first current value based on the acquisition result of the regenerative current acquisition unit 14 and the first current value stored in advance.

When the braking force control unit 16 determines that the regenerative current is equal to or higher than the first current value (a step S11=YES), the controller 10 causes the braking force control unit 16 to increase the mechanical braking force by a predetermined increase amount in a step S12. The braking force control unit 16 increases the mechanical braking force by a predetermined increase amount, for example, by increasing the brake oil pressure acting on the mechanical brake of the braking unit 8 by the change amount ΔP. After that, the controller 10 ends the processing of FIG. 5 and shifts to a step S05 of FIG. 4.

On the other hand, when the braking force control unit 16 determines that the regenerative current is not equal to or higher than the first current value (a step S11=NO), the controller 10 causes the braking force control unit 16 to determine whether the regenerative current is equal to or less than the second current value in a step S13. The braking force control unit 16, for example, determines whether the regenerative current is equal to or less than the second current value based on the acquisition result of the regenerative current acquisition unit 14 and the second current value stored in advance.

When the braking force control unit 16 determines that the regenerative current is equal to or less than the second current value (a step S13=YES), the controller 10 causes the braking force control unit 16 to decrease the mechanical braking force by a predetermined decrease amount in a step S14. The braking force control unit 16 decreases the mechanical braking force by a predetermined decrease amount, for example, by decreasing the brake oil pressure acting on the mechanical brake of the braking unit 8 by the change amount ΔP. After that, the controller 10 ends the processing of FIG. 5 and shifts to the step S05 of FIG. 4.

In the step S14, the controller 10 may maintain a state in which there is no mechanical braking force in a situation in which the brake oil pressure acting on the mechanical brake of the braking unit 8 is 0 because the regenerative current is not equal to or higher than the first current value since the start of the regenerative braking, or a situation in which the brake oil pressure acting on the mechanical brake of the braking unit 8 is 0 as a result of the decrease of the regenerative current exceeding the second current value.

On the other hand, when the braking force control unit 16 determines that the regenerative current is not equal to or less than the second current value (the step S13=NO), the controller 10 maintains the state of the mechanical braking force without increasing or decreasing the brake oil pressure. Alter that, the controller 10 ends the processing of FIG. 5 and shifts to the step S05 of FIG. 4.

Returning to FIG. 4, in the step SOS, the controller 10 executes braking by the autonomous driving control unit 15 so that the acceleration of the industrial vehicle 1 is the required deceleration. For example, the autonomous driving control unit 15 operates the mechanical brake of the braking unit 8 with the mechanical braking force of the distribution adjusted by the braking force control unit 16 against the gravity along the slope acting on the industrial vehicle 1 on the downhill, and in addition to this mechanical brake, performs the regenerative braking of the travel motor of the braking unit 8 at a deceleration obtained by removing the distribution of the mechanical braking force from the required deceleration. As a result, the autonomous driving control unit 15 brakes the industrial vehicle 1 so that the vehicle speed acquired by the travel information acquisition unit 13 is the target vehicle speed. After that, the controller 10 ends the processing of FIG. 4, and repeats the processing of FIG. 4 after a predetermined calculation cycle.

[Action and Effect]

As described above, in the braking control device 100 of the industrial vehicle according to the present embodiment, the autonomous driving control unit 15 executes autonomous driving so that the vehicle speed of the industrial vehicle 1 descending a slope is to be the target vehicle speed based on the vehicle speed information. The industrial vehicle 1 descending a slope is braked by the required braking force including the regenerative braking force. The braking force control unit 16 adjusts the distribution of the mechanical braking force in the required braking force so that the acquired regenerative current is equal to or less than the first current value smaller than the maximum regenerative current. As a result, the regenerative current is smaller than when regenerative braking is performed at the maximum regenerative current, and thus the charging speed of the battery due to regeneration is slower, thereby a state of the battery B can be controlled so as not to approach the fully charged state. Accordingly, according to the braking control device 100 of the industrial vehicle, if is possible to prevent the interruption of the regenerative braking in the industrial vehicle 1 descending a slope by autonomous driving using the regenerative braking without being based on the brake pedal operation.

In the braking control device 100 of the industrial vehicle, the braking force control unit 16 increases the mechanical braking force by a predetermined increase amount when the acquired regenerative current is equal to or higher that the first current value, and decreases the mechanical braking force by a predetermined decrease amount when the acquired regenerative current is equal to or less than the second current value that is smaller than the first current value. As a result, the regenerative current can be decreased by a change amount corresponding to the regenerative braking force equivalent to the increase amount of the mechanical braking force when the regenerative current is equal to or higher than the first current value. In addition, the regenerative current can be increased by a change amount corresponding to the regenerative braking force equivalent to the decrease amount of the mechanical braking force when the regenerative current is equal to or less than the second current value.

In the braking control device 100 of an industrial vehicle, the deceleration change of the mechanical braking force with the increase amount and the decrease amount is smaller than the deceleration change of the regenerative braking force corresponding to the difference between the first current value and the second current value. As a result, although the regenerative braking force changes in response to the mechanical braking force increases or decreases, the regenerative current can be changed within the range between the first current value and the second current value by changing the mechanical braking force by such an increase amount and a decrease amount.

In the braking control device 100 of an industrial vehicle, the absolute values of the increase amount mid the decrease amount are equal to each other. As a result, for example, one parameter (for example, the change amount ΔP of the brake oil pressure) can be treated as both an increase amount and a decrease amount by adding with plus symbol or minus symbol, and it is possible to simplify the processing.

In the industrial vehicle 1, although the downhill has the same downhill gradient, the value that the required braking force can take varies widely in response to the weights of the load being towed or handled. Although the weights of the load being towed or handled are the same, the value that the required braking force can take varies widely in response to the magnitude of the downhill gradient. In this regard, according to the braking control device 100 of the industrial vehicle, it is possible to prevent the regenerative current from exceeding the first current value, so that the burden on the travel motor and the battery B can be prevented. Since the mechanical braking force is automatically increased or decreased in response to the regenerative current, the trouble of reviewing the settings of the target value of the brake oil pressure acting on the mechanical brake of the braking unit 8 or the target value of the regenerative braking force for each travel is omitted. Since the regenerative current is suppressed at a constant level or less instead of the state of charge (SOC), the charging speed decreases. Accordingly, the time until the battery B reaches the fully charged state can be extended. The time until a situation in which regenerative braking is unusable and the braking force is insufficient (so-called regenerative loss) occurs, can be extended. As a result, it is easy to formulate a travel plan for autonomous driving to avoid regenerative loss on all downhills in a predetermined area such as an airport in which the industrial vehicle 1 is traveled.

MODIFICATION EXAMPLE

Although the embodiment according to the present disclosure is described above, the present disclosure is not limited to the embodiment described above.

In the above embodiment, the processing illustrated in FIG. 4 is executed when the industrial vehicle 1 during autonomous driving travels on a downhill having a slope such that the battery B can be overcharged unless the regenerative current is prevented, but is not limited thereto. For example, the processing illustrated in FIG. 4 may be configured to be executed when the gradient of the road on which the industrial vehicle 1 travels is equal to or higher than a constant gradient threshold value. In this case, the gradient threshold value can be included in the map information of the map database 24 in advance. The gradient threshold value may be compared with the measurement result of the gradient sensor provided in the industrial vehicle 1. In addition, the processing illustrated in FIG. 4 may be configured to be executed on all the downhills when the industrial vehicle 1 that travels by autonomous driving is descending a slope.

In the above embodiment, the absolute values of the increase amount and the decrease amount are equal to each other, but are not limited thereto. The increase amount and the decrease amount may be different in magnitude from each other.

In the above embodiment, the deceleration change of the mechanical braking force with the increase amount and the decrease amount is smaller than the deceleration change of the regenerative braking force corresponding to the difference between the first current value and the second current value, but is not limited thereto.

In the above embodiment, the braking force control unit 16 increases the mechanical braking force by a predetermined increase amount when the acquired regenerative current is equal to or higher than the first current value, and decreases the mechanical braking force by a predetermined decrease amount when the acquired regenerative current is equal to or less than the second current value that is smaller than the first current value, but is not limited thereto. For example, the mechanical braking force may be increased when the acquired regenerative current is equal to or higher than a variable current threshold value smaller than the first current value. In short, the distribution of the mechanical braking force in the required braking force may be adjusted so that the acquired regenerative current is equal to or less than the first current value smaller than the maximum regenerative current.

In the above embodiment, the industrial vehicle 1 is not provided with the brake pedal, but for example, the brake pedal for maintenance or the like that are not used in the autonomous driving may be provided.

In the above embodiment, the electric towing tractor as illustrated in FIG. 1 is illustrated as the industrial vehicle 1, but the present disclosure is not limited thereto, and the industrial vehicle 1 may be, for example, an electric forklift or may be a hybrid type industrial vehicle. In short, any industrial vehicle may be used as long as the battery B can be charged by regenerative braking, a travel motor that generates regenerative braking force and a mechanical brake that generates mechanical braking force are provided as a braking unit, and the distribution of regenerative braking force and mechanical braking force can be adjusted based on the required deceleration.

Although the configuration in which the ESC unit 32 is used is exemplified as the mechanical braking system that generates the mechanical braking force, other hydraulic control devices may be used. The mechanical brake is not limited to the disc brake and the drum brake using oil pressure, and the braking force of the left electromagnetic brake 6c and the right electromagnetic brake 7c may be treated as the mechanical braking force.

The configuration for autonomous driving of the industrial vehicle 1 is not limited to the example of the above embodiment. For example, although the LiDAR is used in the surrounding situation sensor 22, another sensor may be used instead.

At least a part of the embodiments described above and various modification examples may be optionally combined.

What is claimed is:

1. A braking control device of an industrial vehicle including a travel motor configured to generate regenerative braking force and a mechanical brake configured to generate mechanical braking force as a braking unit and including a battery configured to be charged by the regenerative braking force, the braking control device comprising:
   a vehicle speed information acquisition unit configured to acquire vehicle speed information of the industrial vehicle;
   a regenerative current acquisition unit configured to acquire a regenerative current of the travel motor;
   an autonomous driving control unit configured to execute autonomous driving with a required braking force including the regenerative braking force for causing a vehicle speed of the industrial vehicle descending a slope to be a target vehicle speed, based on the vehicle speed information; and
   a braking force control unit configured to adjust distribution of the mechanical braking force in the required braking force so that the acquired regenerative current is equal to or less than an upper regenerative threshold value smaller than a maximum regenerative current.

2. The braking control device of an industrial vehicle according to claim 1, wherein
   the braking force control unit is configured to
   increase the mechanical braking force by a predetermined increase amount when the acquired regenerative current is equal to or higher than the upper regenerative threshold value, and
   decrease the mechanical braking force by a predetermined decrease amount when the acquired regenerative current is equal to or less than a lower regenerative threshold value smaller than the upper regenerative threshold value.

3. The braking control device of an industrial vehicle according to claim 2, wherein
   absolute values of the increase amount and the decrease amount are equal to each other.

4. A braking control device of an industrial vehicle including a travel motor configured to generate regenerative braking force and a mechanical brake configured to generate mechanical braking force as a braking unit and including a battery configured to be charged by the regenerative braking force, the braking control device comprising:
   a vehicle speed information acquisition unit configured to acquire vehicle speed information of the industrial vehicle;
   a regenerative current acquisition unit configured to acquire a regenerative current of the travel motor;
   an autonomous driving control unit configured to execute autonomous driving with a required braking force including the regenerative braking force for causing a vehicle speed of the industrial vehicle descending a slope to be a target vehicle speed, based on the vehicle speed information; and
   a braking force control unit configured to adjust distribution of the mechanical braking force in the required braking force so that the acquired regenerative current is equal to or less than an upper regenerative threshold value smaller than a maximum regenerative current,
   wherein the braking force control unit is configured to
      increase the mechanical braking force by a predetermined increase amount when the acquired regenerative current is equal to or higher than the upper regenerative threshold value, and
      decrease the mechanical braking force by a predetermined decrease amount when the acquired regenerative current is equal to or less than a lower regenerative threshold value smaller than the upper regenerative threshold value,
   wherein
   a deceleration change of the mechanical braking force with the increase amount and the decrease amount is smaller than a deceleration change of the regenerative braking force corresponding to a difference between the upper regenerative threshold value and the lower regenerative threshold value.

* * * * *